United States Patent
Kim et al.

(10) Patent No.: US 6,909,337 B2
(45) Date of Patent: Jun. 21, 2005

(54) NONCOHERENT PULSE POSITION AND PHASE SHIFT KEYING TRANSMISSION/ RECEPTION SYSTEM AND A TRANSMISSION/RECEPTION SIGNAL PROCESSING METHOD THEREFOR

(75) Inventors: Wan-jin Kim, Seoul (KR); Do-hoon Kwon, Seoul (KR); Woo-kyung Lee, Daejeon (KR); Yong-suk Kim, Daejeon (KR)

(73) Assignee: Samsung Electronics Co., Ltd. (KR)

( * ) Notice: Subject to any disclaimer, the term of this patent is extended or adjusted under 35 U.S.C. 154(b) by 113 days.

(21) Appl. No.: 10/656,330

(22) Filed: Sep. 8, 2003

(65) Prior Publication Data

US 2004/0257167 A1 Dec. 23, 2004

(30) Foreign Application Priority Data

Jun. 18, 2003 (KR) .................. 10-2003-0039377

(51) Int. Cl.[7] .................. H03K 7/10; H03K 9/10; H03C 3/00; H03D 3/00; H04L 27/32
(52) U.S. Cl. .................. 332/108; 332/103; 332/112; 375/239; 375/279; 375/295; 375/308; 375/316; 375/329
(58) Field of Search .................. 332/103–106, 332/108, 112–114; 375/239, 279–284, 295, 308, 316, 329–333

(56) References Cited

U.S. PATENT DOCUMENTS 6,118,805 A * 9/2000 Bergstrom et al. .......... 375/132

* cited by examiner

Primary Examiner—David Mis
(74) Attorney, Agent, or Firm—Sughrue Mion, PLLC

(57) ABSTRACT

Disclosed is a noncoherent pulse position and phase shift keying (PPPSK) transmission/reception system and a transmission/reception signal processing method therefor. Transmission system has an information generation unit for generating information data; a modulation unit for deciding a phase and a timing position corresponding to generated information data; and a wavelet generation unit for generating a wavelet based on the decided phase and timing position, and the reception system has an offset unit for mixing the reception signal with a high-frequency component corresponding to a center frequency of a transmission frequency band and offsetting a high frequency of the reception signal; a demodulation unit for generating at least one reference signal based on a previous signal precedingly received with respect to the reception signal and mixing the reference signals and the reception signal; and a decision unit for deciding information data corresponding to the reception signal based on mixing results.

22 Claims, 12 Drawing Sheets

FIG. 1
(PRIOR ART)
(a)
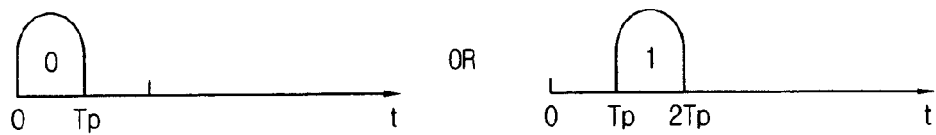
(b)
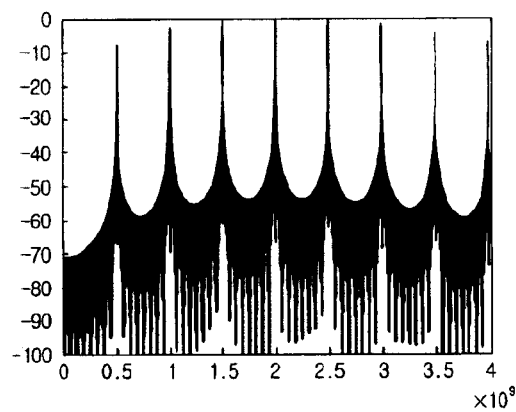
(c)
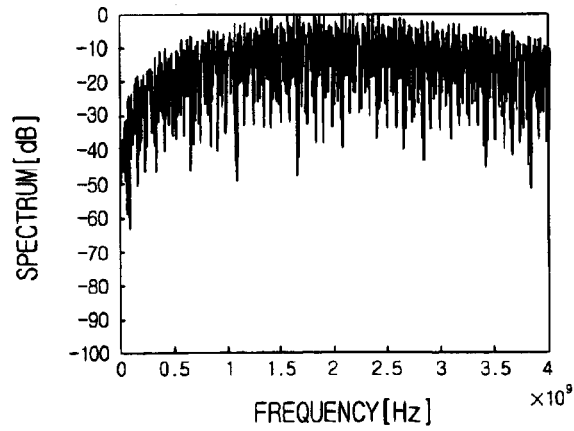

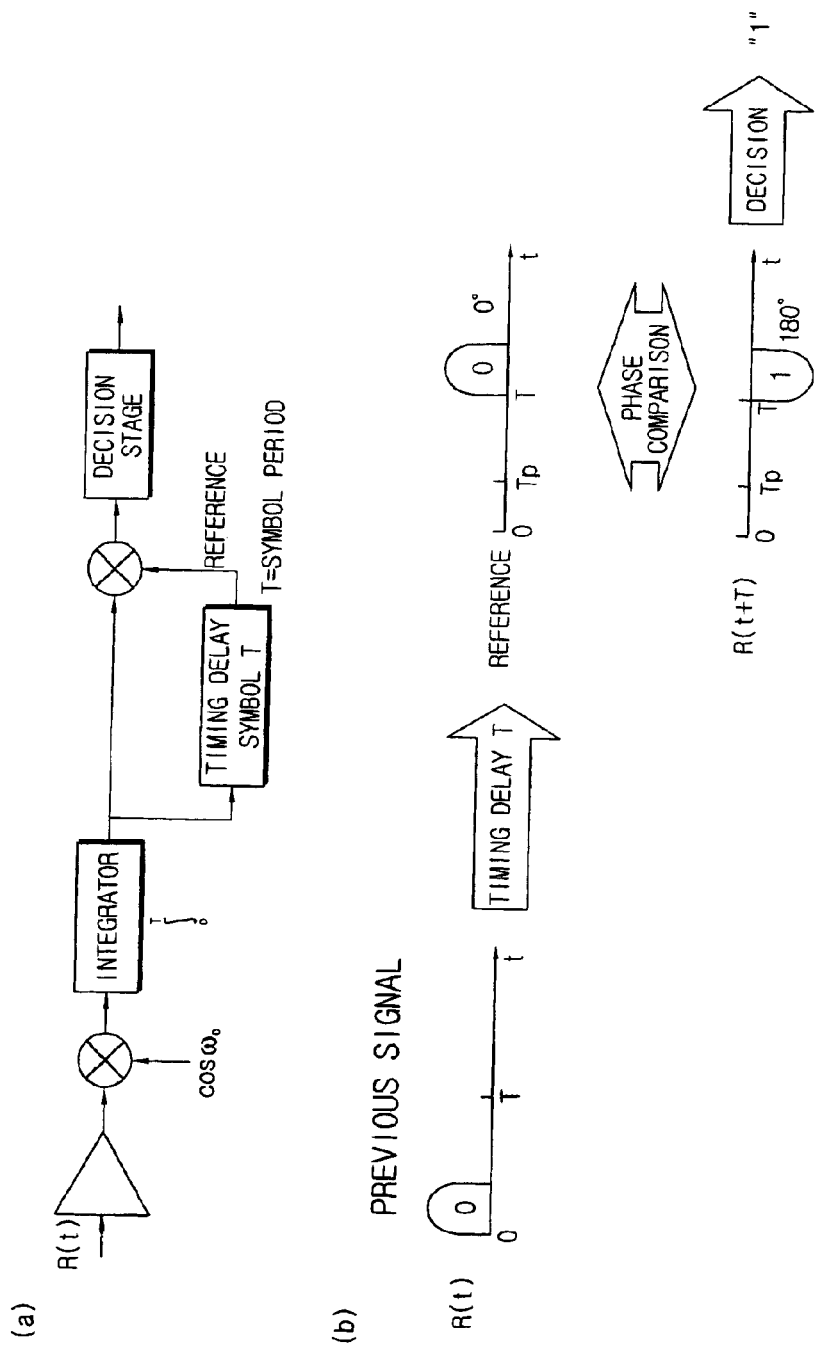

WAVELET IN TIME DOMAIN

BINARY PPM-APPLIED TIME FRAME STRUCTURE

NONCOHERENT PULSE POSITION AND PHASE SHIFT KEYING TRANSMISSION/ RECEPTION SYSTEM AND A TRANSMISSION/RECEPTION SIGNAL PROCESSING METHOD THEREFOR

BACKGROUND

This application claims the priority of Korean Patent Application No. 2003-39377, filed on Jun. 18, 2003, in the Korean Intellectual Property Office, the disclosure of which is incorporated herein in its entirety by reference.

1. Field of the Invention

The present invention relates to a wireless communication transmission/reception system for ultra-wideband (UWB) wireless communication environments, and more particularly to a transmission/reception system and a transmission/reception signal processing method therefor which use noncoherent modulation/demodulation techniques in UWB wireless communication environments.

2. Description of the Related Art

In wireless communication environments using a wide frequency band such as UWB (3.1~10.6 GHz), there is the UWB signal band approach using the entire frequency band as one band and the UWB multi-band approach using subbands by dividing the entire frequency band into the limited number of subbands, and as for the time domain, continuous waveforms having a signal in all the time domain are not used, but waveforms having a signal at certain time intervals are used.

Due to such signal characteristics, mainly used for the UWB communications is the pulse position modulation (PPM) detecting in which a signal exists in a time slot of prescribed time slots and the phase shift keying (PSK) modulation using signal phase information.

FIG. 1 is a view for explaining the pulse position modulation (PPM).

As shown in FIG. 1(a), a signal becomes different depending upon in which time slot the signal exists. That is, a receiver demodulates a reception signal into "0" if the signal exists in the first time slot, and into "1" if the signal exists in the second time slot as its decision result.

As above, one of the most important factors in the pulse position modulation is the time synchronization upon implementation. A very precise time synchronization is most important to obtain an absolutely precise signal position.

In particular, in case that a narrow wave pulse (referred to as a wavelet, hereinafter) of a few hundred psec~a few nsec is used for communications as in the UWB system, considerable difficulties are accompanied in the precise time synchronization of a few tens of pico seconds (psec).

Further, in case that pulses repeatedly appear in the same period, as shown in (b) of FIG. 1, large spikes are generated at every frequency corresponding to the reverse number of a pulse period. Accordingly, if the pulse position modulation is used, a circuit is needed to improve the spike magnitudes through the pseudo random time hopping sequence as shown in (c) of FIG. 1, which causes the entire reception system to become more complex.

In the meantime, if the phase shift keying (PSK) modulation is used, essentially needed is a time synchronization circuit having a high time resolution ability in order to find out precise phase information and a circuit for predicting a precise channel. Further, the use of a pulse having a very short time width makes it difficult to obtain multi-level phase information over the Quadrature PSK (QPSK). Accordingly, the amount of information a pulse can carry becomes small.

As above, of communication methods using signal phases, there is the Differential PSK (DPSK) performing noncoherent communications in use of relative phases to previous signals without finding out the absolute phase in time. The noncoherent DPSK system has slightly deteriorated functions compared to a coherent receiver, but has a relatively simple and easy-to-implement advantage.

FIG. 2 is a view for explaining the Differential Phase Shit Keying (DPSK) modulation.

The (a) of FIG. 2 is a view for showing a demodulator of a receiver for demodulating a DPSK-modulated reception signal. As shown in (b) of FIG. 2, the demodulator delays a signal R(t) received at t=0 by a symbol period T. The demodulator compares phases of a current reception signal R(t) and the T-delayed signal R(t+T) as a reference signal, and determines its output signal. For example, the demodulator demodulates the current reception signal into "0" if in phase, and into "1" if out of phase.

The noncoherent DPSK modulation as above has an easy-to-achieve advantage, but, in general, such noncoherent modulation is not used for UWB communications. This is because there exists a problem in that the noncoherent modulation needs the required energy per bit (Eb/No) about 3 dB higher for signal receptions compared to the coherent modulation so that communication performances are deteriorated.

SUMMARY

The present invention has been devised to solve the above problem, so it is an object of the present invention to provide a noncoherent pulse position and phase shift keying transmission/reception system and a transmission/reception signal processing method therefor.

In order to achieve the above object, a noncoherent pulse position and phase shift keying(PPPSK) transmission system according to the present invention comprises an information generation unit for generating information data; a modulation unit for deciding a phase and a timing position corresponding to the generated information data; and a wavelet generation unit for generating a pulse based on the decided phase and timing position, and generating a wavelet formed with the pulse carrying a wave corresponding to a center frequency of a transmission frequency band thereon.

The modulation unit includes a series/parallel converter for separating the information data into phase information data and time information data; a phase modulator for deciding a phase of the wavelet based on the phase information data; and a position modulator for deciding a timing position of the wavelet based on the time information data.

The position modulator includes a delay part having at least one or more delay units; and a switching unit for selecting any of the delay units based on the time information data, and the position modulator decides a timing position of the wavelet based on a delay state of the selected delay unit.

In an exemplary embodiment, the information data includes n bits, and includes the phase information data of m bits and the time information data of l bits.

In the meantime, a signal processing method for a noncoherent PPPSK transmission system according to the present invention comprises steps of generating information data; deciding a phase and a timing position corresponding to the generated information data; and generating a pulse based on the decided phase and timing position, and generating a wavelet formed with the pulse carrying a wave corresponding to a center frequency of a transmission frequency band thereon.

The decision step includes steps of separating the information data into phase information data and time information data; deciding a phase of the wavelet based on the phase information data; and deciding a timing position of the wavelet based on the time information data.

The wavelet timing position decision step includes steps of selecting any of at least one or more delay states based on the time information data; and deciding a timing position of the wavelet based on the selected delay state.

A noncoherent PPPSK reception system comprises a wavelet generation unit for generating a high-frequency component corresponding to a center frequency of a transmission frequency band; an offset unit for offsetting a high frequency of a reception signal by using the generated high-frequency component; a demodulation unit for generating at least one or more reference signals based on a previous signal precedingly received with respect to the reception signal from which the high-frequency component is offset, and mixing the reference signals and the reception signal; and a decision unit for deciding information data corresponding to the reception signal based on mixing results.

The demodulation unit includes a delay part having at least one or more delay units for generating at least one or more reference signals based on the previous signal; and at least one or more mixers for mixing the reception signal with the reference signals.

The decision unit decides time information data of the reception signal based on the same timing position of a reference signal of the reference signals generated from the delay part as the timing position of the reception signal, compares a phase of the reference signal having the same timing position as the timing position of the reception signal with a phase of the reception signal and decides phase information data of the reception signal, and recovers the information data corresponding to the reception signal by using the time information data and the phase information data.

In the meantime, a signal processing method for a noncoherent PPPSK reception system comprises steps of generating a high-frequency component corresponding to a center frequency of a transmission frequency band; offsetting a high frequency of a reception signal by using the generated high-frequency component; generating at least one or more reference signals based on a previous signal previously received with respect to the reception signal from which the high-frequency component is offset, and mixing the reference signals and the reception signal; and deciding information data corresponding to the reception signal based on mixing results.

The mixing step includes steps of generating at least one or more reference signals based on the previous signal; and mixing the reception signal with the reference signals respectively.

The decision step decides time information data of the reception signal based on the same timing position of a reference signal of the generated reference signals as the timing position of the reception signal, compares a phase of the reference signal having the same timing position as the timing position of the reception signal with a phase of the reception signal and decides phase information data of the reception signal, and recovers the information data corresponding to the reception signal by using the time information data and the phase information data.

As aforementioned, the noncoherent pulse position and phase shift keying transmission/reception system improves a wavelet transmission efficiency, simplifies its structure, and reduces power consumption.

BRIEF DESCRIPTION OF THE DRAWINGS

The invention will be described in detail with reference to the following drawings in which like reference numerals refer to like elements, and wherein:

FIG. 1 is a view for explaining the pulse position modulation(PPM);

FIG. 2 is a view for explaining the Differential Phase Shift keying(DPSK) Modulation;

DETAILED DESCRIPTION OF THE EXEMPLARY EMBODIMENTS

Hereinafter, the present invention will be described in detail with reference to the accompanying drawings.

Figure 3A:
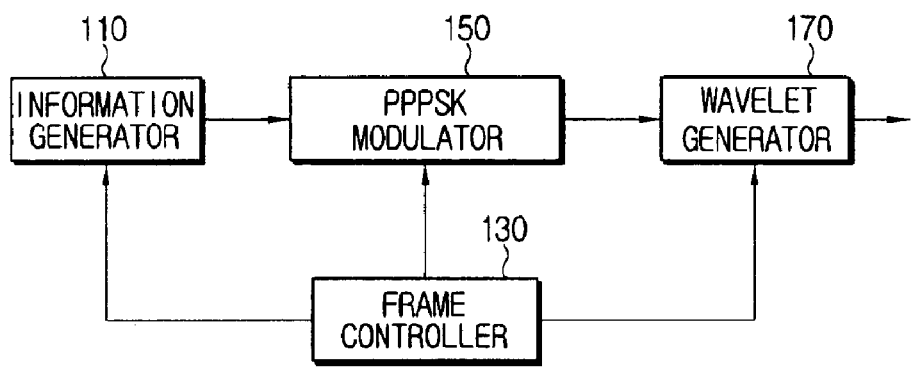
FIG. 3a is a schematic block diagram for showing a single-band pulse position and phase shift keying(PPPSK) transmission system according to an embodiment of the present invention.
Figure 3B:
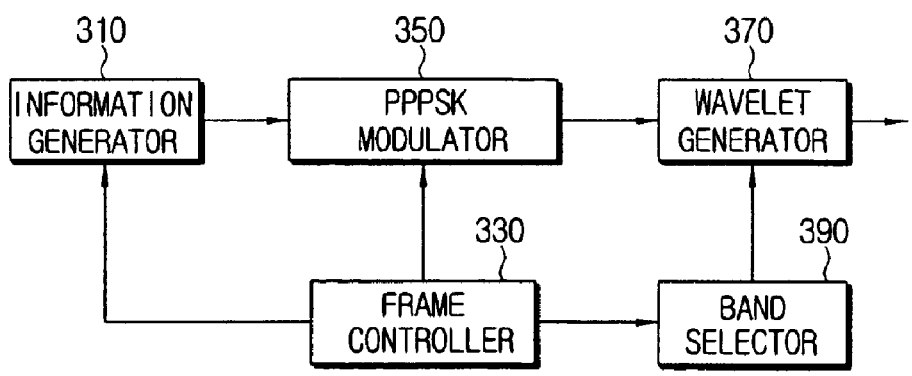
FIG. 3b is a schematic block diagram for showing a multi-band PPPSK transmission system according to an embodiment of the present invention.

FIG. 3a and FIG. 3b are schematic block diagrams for showing a noncoherent pulse position and phase shift keying (PPPSK) transmission system according to an embodiment of the present invention.

FIG. 3a is a schematic block diagram for showing a single-band PPPSK transmission system 100, and FIG. 3b is a schematic block diagram for showing a multi-band PPPSK transmission system 300. Hereinafter, a PPPSK transmission system according to the present invention will be described in detail with the multi-band PPPSK transmission system 300 shown in FIG. 3b.

The multi-band PPPSK transmission system 300 has an information generator 310, a frame controller 330, a PPPSK modulator 350, a wavelet generator 370, and a band selector 390.

The information generator 310 generates information data.

The frame controller 330 controls the PPPSK modulator 350 and the band selector 390 to process the generated information data frame by frame.

The PPPSK modulator 350 separates information data into phase information data and time information data, and decides a phase and timing position for information data based on the separated phase information data and time information data.

The wavelet generator 370 generates pulses corresponding to the phases and timing positions decided in the PPPSK modulator 350. Further, the wavelet generator 370 generates wavelets formed with pulses carrying a wave corresponding to a center frequency of a selected subband thereon. Accordingly, phase-modulated and pulse-modulated information data is transmitted through a selected subband.

That is, the single-band PPPSK transmission system 100 shown in FIG. 3a uses all of the entire frequency band, so the band selector 390 for selecting a subband is not needed.

Figure 4A:
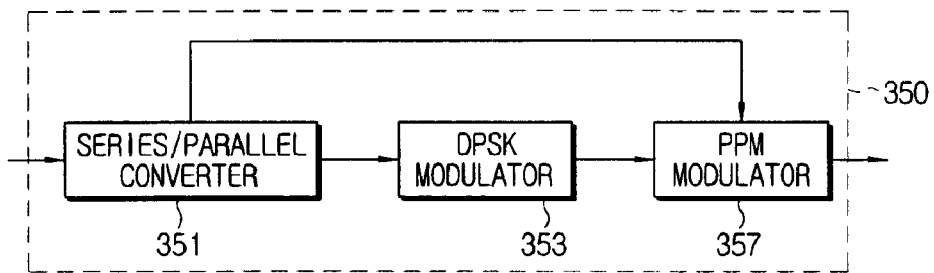
FIGS. 4a, 4b, and 4c show various PPPSK modulators for a transmission system according to an embodiment of the present invention.
Figure 4B:
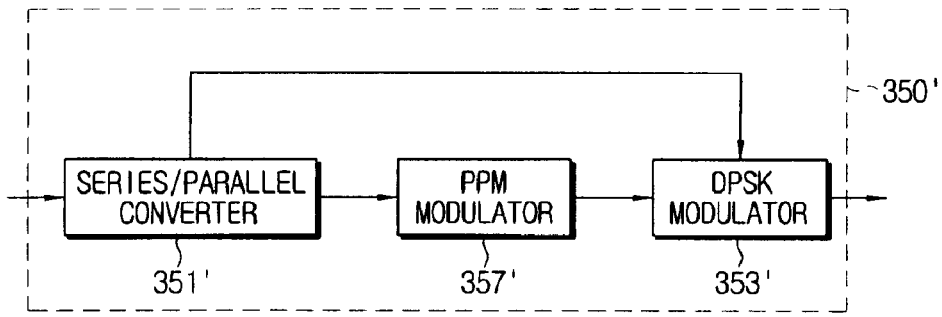
Figure 4C:
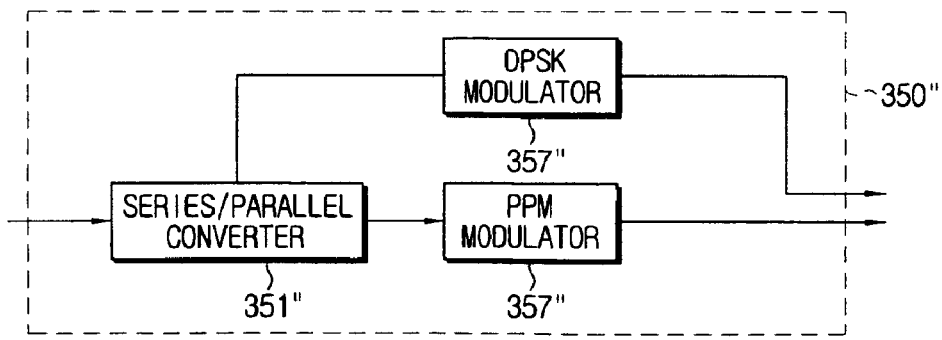

FIGS. 4a–4c show various PPPSK modulators 350, 350', and 350" according to embodiments of the present invention. As shown FIG. 4a, the PPPSK modulator 350 has a series/parallel converter 351, a DPSK modulator 353, and a PPM modulator 357.

The series/parallel converter 351 separates generated n-bit information data into m-bit phase information data and l-bit time information data, wherein n=m+l, and, n, m, and l are a natural numbers.

The DPSK modulator 353 decides a wavelet phase for information data based on the m-bit phase information data of the separated information data.

The PPM modulator 357 decides a wavelet timing position for information data based on the l-bit time information data of the separated information data.

The PPPSK modulator 350 operating as above can be diversely constructed as shown in FIGS. 4a–4c, bringing about the same PPPSK modulation result.

Figure 5:
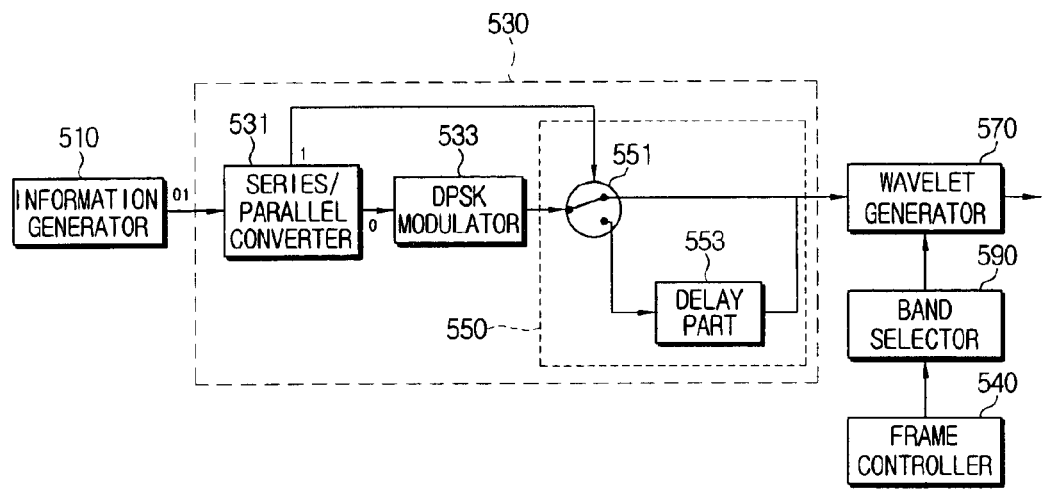
FIG. 5 is a detailed block diagram for showing a multi-band PPPSK transmission system according to an embodiment of the present invention.
Figure 6:
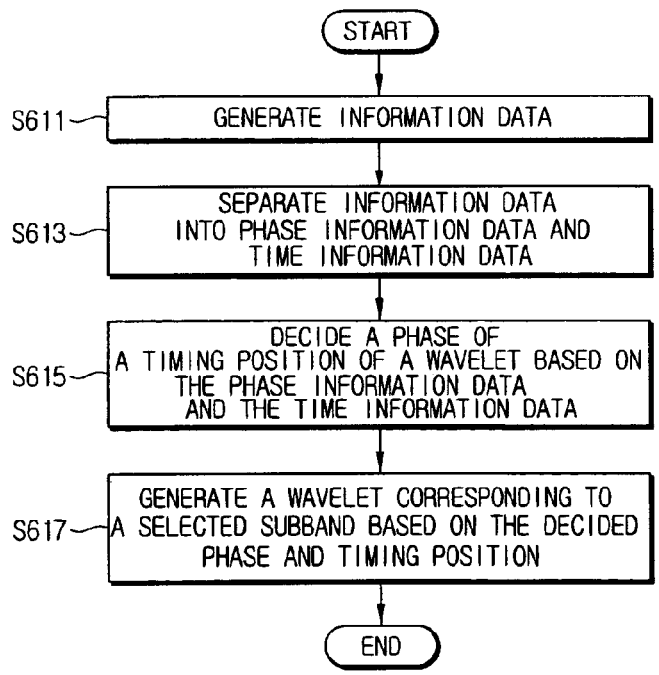
FIG. 6 is a flow chart for showing a signal processing method for the multi-band PPPSK transmission system of FIG. 5.

FIG. 5 is a detailed block diagram for showing a multi-band PPPSK transmission system according to an embodiment of the present invention, and FIG. 6 is a flow chart for showing a signal processing method for the multi-band PPPSK transmission system. Hereinafter, with reference to FIG. 5 and FIG. 6, the transmission signal processing method for the multi-band PPPSK transmission system is described with the PPPSK modulation applying a binary DPSK modulation and a binary PPM shown in FIG. 9a to FIG. 9d, for example. It can be expanded to a multi-level DPSK modulation and a multi-level PPM, of course.

Figure 9A:
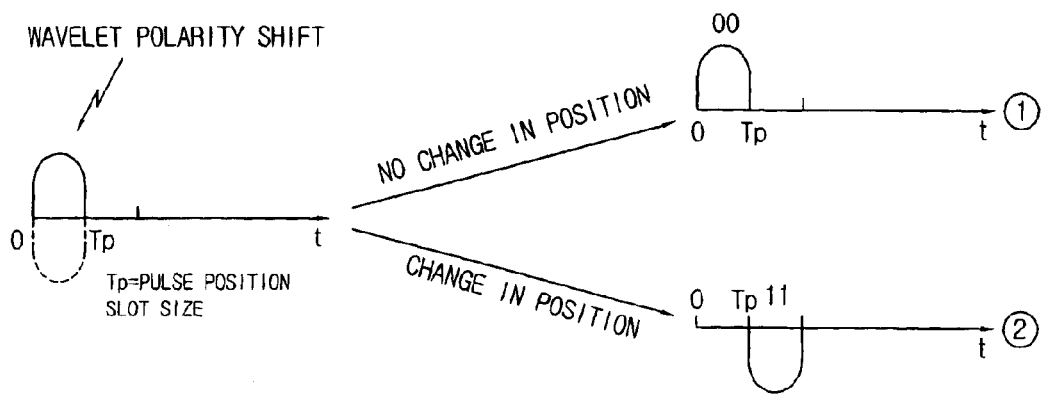
FIGS. 9a, 9b, 9c, and 9d are views for explaining a noncoherent PPPSK modulation.

FIG. 9a shows information data, and its corresponding wavelet phase and timing position. As shown in FIG. 9a, the upper 1-bit data of 2-bit information data becomes phase information data, and the lower 1-bit data becomes time information data.

That is, in case of information data of "00", as shown in ① of FIG. 9a, the phase of a wavelet is decided as 0° in correspondence to phase information data of "0", and the timing position of the wavelet is decided as t=0 in correspondence to time information data of "0".

In case of information data of "11", as shown in ② of FIG. 9a, the phase of the wavelet is decided as 180° in correspondence to phase information data of "1", and the timing position of the wavelet is decided as t=Tp in correspondence to time information data of "1".

The following are the descriptions of a signal processing process for a transmission system 500 to which the above PPPSK modulation is applied according to an embodiment of the present invention.

An information generator 510 generates information data of "01" to be transmitted (S611).

The information data of "01" is inputted to the PPPSK modulator 530.

The series/parallel converter 531 separates information data into phase information data and time information data (S613). The information data of "01" is separated into phase information data of "0" and time information data of "1". The separated phase information data of "0" and the time information data of "1" are inputted to the DPSK modulator 533 and the PPM modulator 550, respectively.

The DPSK modulator 533 decides the wavelet phase as 0° based on the phase information data of "0" (S615).

The PPM modulator 550 has a switching unit 551 and a delay part 553.

If the time information data of "1" is inputted, the switching unit 551 is switched to the delay part 553 to delay the time information data by a certain time of Tp for an output, and, if the time information data of "0" is inputted, the switching unit 551 is switched to a wavelet generator 570. Accordingly, the PPM modulator 550 decides the timing position of information data depending upon the delay state of the time information data.

In such a manner, the PPM modulator 550 decides the timing position of a wavelet as t=Tp based on the time information data of "1" (S615).

Figure 9B:
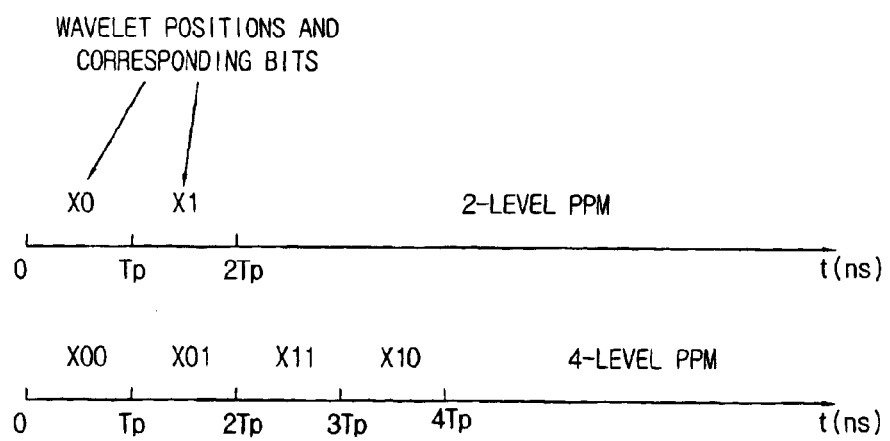

FIG. 9b is a view for explaining the timing positions of wavelets times corresponding to information data bits according to the PPM. As shown in FIG. 9b, in the two-level PPM, 1-bit data is indicated according to timing positions. That is, if t=0, the data is "0", and, if t=Tp, the data is "1".

In the same manner, in the four-level PPM, 2-bit data is indicated. Accordingly, in case of a PPM modulator to which the four-level PPM is applied, the delay states are divided into 0, Tp, 2Tp, and 3Tp, and, accordingly, the delay part has three delay units. Of course, in this case, the time information data is 2-bit data, and the switching unit selects a delay state based on the time information data.

As above, the phase and timing positions decided in the PPPSK modulator 530 is provided to the wavelet generator 570. The band selector 590 selects a corresponding subband according to the controls of the frame controller 540.

Accordingly, the wavelet generator 570 generates a pulse in the decided phase and at the decided timing position, and further, carry on a pulse a wave corresponding to a center frequency of a selected subband, and finally outputs a wavelet (S617).

Figure 9C:
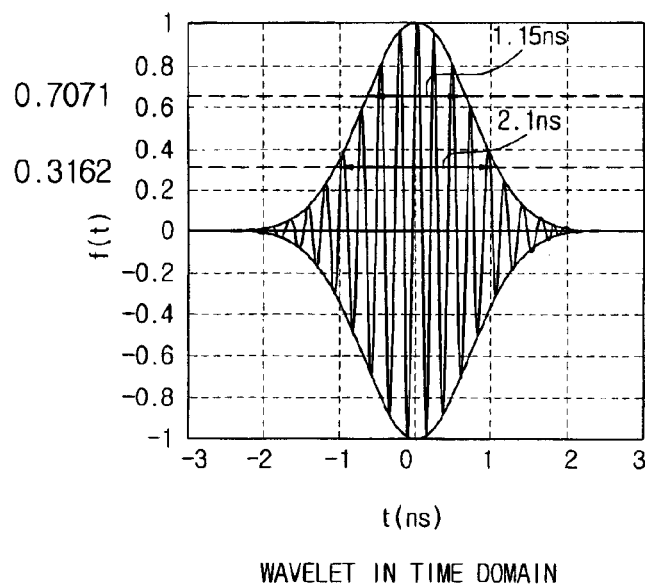

FIG. 9c is a view for showing an example of a wavelet in the time domain. The wavelet shown in FIG. 9c is a signal having a Gaussian shape in a signal waveform of the time domain and in a spectrum magnitude of the frequency domain. A Gaussian wavelet in the time and frequency domains is expressed in Equations (1) and (2) as follows:

$$F(\omega)=\exp[-j\omega t_c]\exp[-(\omega-\omega_c)^2/2\epsilon^2] \quad (1)$$

$$f(t) = \exp[j\omega_c(t-t_c)]\frac{\varepsilon}{\sqrt{2\pi}}\exp[-\varepsilon^2(t-t_c)^2/2] \quad (2)$$

In the Equations (1) and (2), $\omega_c$ denotes a center frequency of a frequency band for a wavelet, and $t_c$ a delay time with respect to a reference time t=0 at which the highest point of the wavelet is reached in the time domain. Strictly speaking, the Gaussian-shaped envelope exists over an infinite time and frequency region, but substantially exists over an finite time and frequency region due to an abrupt magnitude attenuation from the center portion of a wavelet. $\epsilon$ denotes a parameter determining a width of a wavelet in the time and frequency region. A wavelet occupies a limited area only in the time and frequency region, so the components that can be used for wavelet communications are time, frequency, and phase.

As shown in FIG. 9c, in case of the 700 MHz-bandwidth multi-band format, one Gaussian-shaped wavelet has a time width of 2.1 nsec at 10 dB. Accordingly, 2.5 nsec becomes sufficient for a time slot for which one wavelet exists.

Figure 9D:

FIG. 9d is a view for showing a time frame structure to which the binary PPM scheme is applied. As shown in FIG. 9d, one wavelet according to the present invention has data of at least 2 bits or more depending upon its phase and timing position, so that a guard time of about 70 nsec can be secured between wavelets. Therefore, robust characteristics against multi-path interferences can be obtained.

Figure 7:
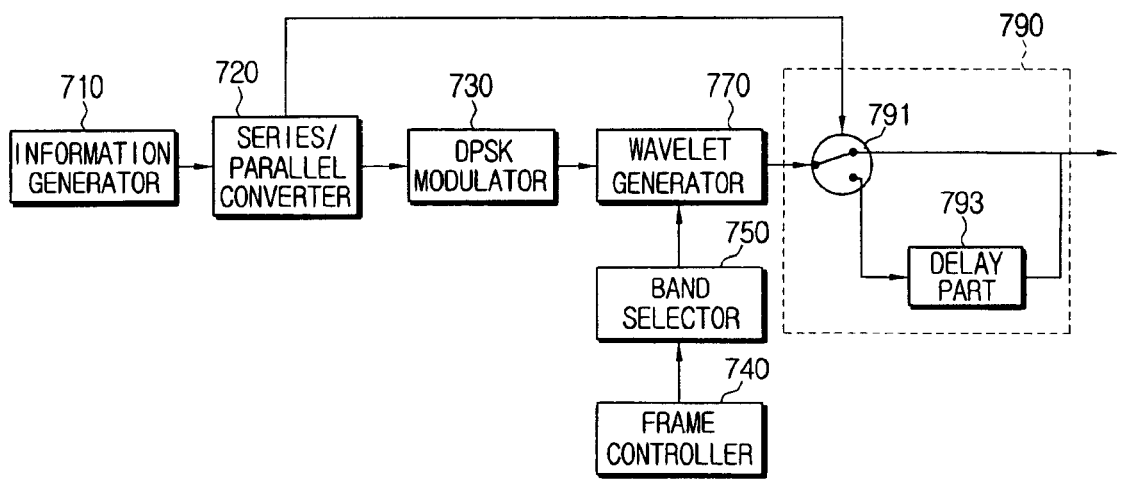
FIG. 7 is a detailed block diagram for showing a multi-band PPPSK transmission system according to another embodiment of the present invention.
Figure 8:
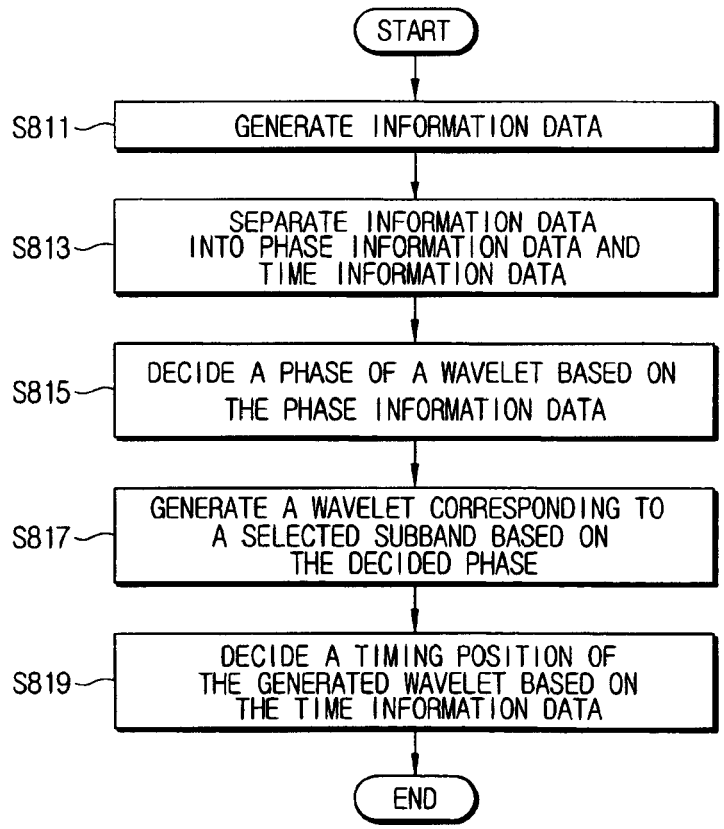
FIG. 8 is a flow chart for showing a signal processing method for the multi-band PPPSK transmission system of FIG. 7.

FIG. 7 is a block diagram for showing a multi-band PPPSK transmission system according to another embodiment of the present invention, and FIG. 8 is a flow chart for showing a signal processing method for the multi-band PPPSK transmission system. Hereinafter, the operations of the multi-band PPPSK transmission system according to another embodiment of the present invention will be described based on a modulation method of the PPPSK transmission system shown in FIG. 8.

An information generator 710 generates information data to be transmitted (S811). The generated information data is separated into phase information data including phase information and time information data including time information by a series/parallel converter 720 (S813).

The separated phase information data is inputted to a DPSK modulator 730, and the DPSK modulator 730 decides a wavelet phase based on the phase information data (S815).

The decided phase information is provided to a wavelet generator 770, and the wavelet generator 770 generates a wavelet corresponding to a subband selected by a band selector 750 based on the decided phase information (S817).

Thereafter, a PPM modulator 790 decides a timing position of the phase-decided wavelet based on the inputted time information data (S819).

Accordingly, the wavelet outputted from the PPM modulator 790 has the phase and timing position corresponding to the information data.

A signal modulated into the phases and timing positions by the PPPSK scheme combining the DPSK scheme and the PPM scheme is demodulated to original information data by a reception system to which the PPPSK scheme is applied.

Hereinafter, a PPPSK reception system according to the present invention will be described.

Figure 10A:
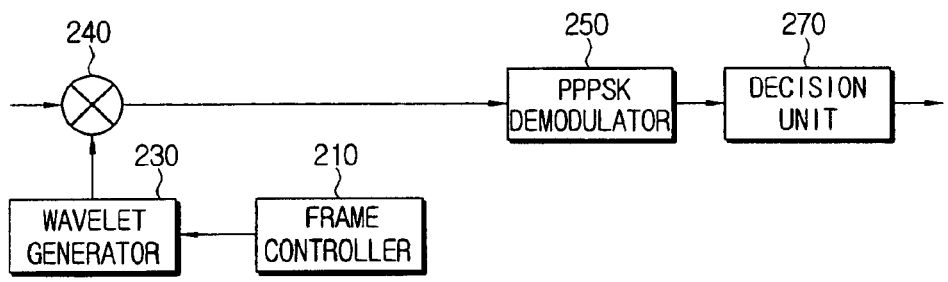
FIG. 10a is a schematic block diagram for showing a single-band PPPSK reception system according to an embodiment of the present invention.
Figure 10B:
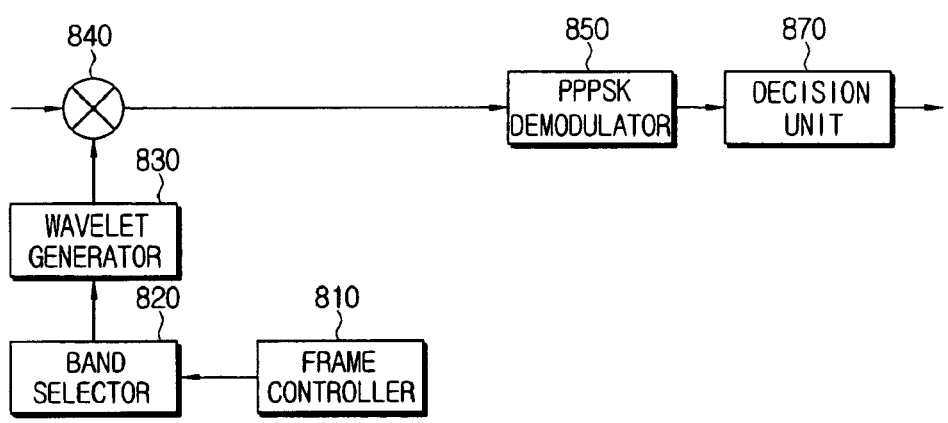
FIG. 10b is a schematic block diagram for showing a multi-band PPPSK reception system according to an embodiment of the present invention.

FIG. 10a and FIG. 10b are views for showing PPPSK reception systems according to the present invention, FIG. 10a is a schematic block diagram for showing a single-band PPPSK reception system 200, and FIG. 10b is a schematic block diagram for showing a multi-band PPPSK reception system 800. Hereinafter, with the multi-band PPPSK reception system 800 shown in FIG. 10b, the PPPSK reception system according to the present invention will be schematically described.

The multi-band PPPSK reception system has a frame controller 810, a band selector 820, a wavelet generator 830, an offset unit 840, a PPPSK demodulator 850, and a decision unit 870.

The frame controller 810 provides frame information of a reception signal to the band selector 820.

The band selector 820 selects a subband of a received wavelet based on frame information provided from the frame controller 810.

The wavelet generator 830 generates a high-frequency component of a center frequency corresponding to the subband of the received wavelet.

The offset unit 840 multiplies the generated high frequency component by the received wavelet, and low-pass-filters the multiplication result to offset a high frequency component of the received wavelet. Accordingly, the offset unit 840 outputs a signal having only a low-frequency component, that is, only an envelope-shaped of the wavelet is detected from the offset unit 840.

The PPPSK demodulator 850 demodulates the wavelet outputted from the offset unit 840 using the DPSK and PPM demodulation schemes.

The decision unit 870 recovers original information data based on the PPPSK-demodulated signal.

Figure 11:
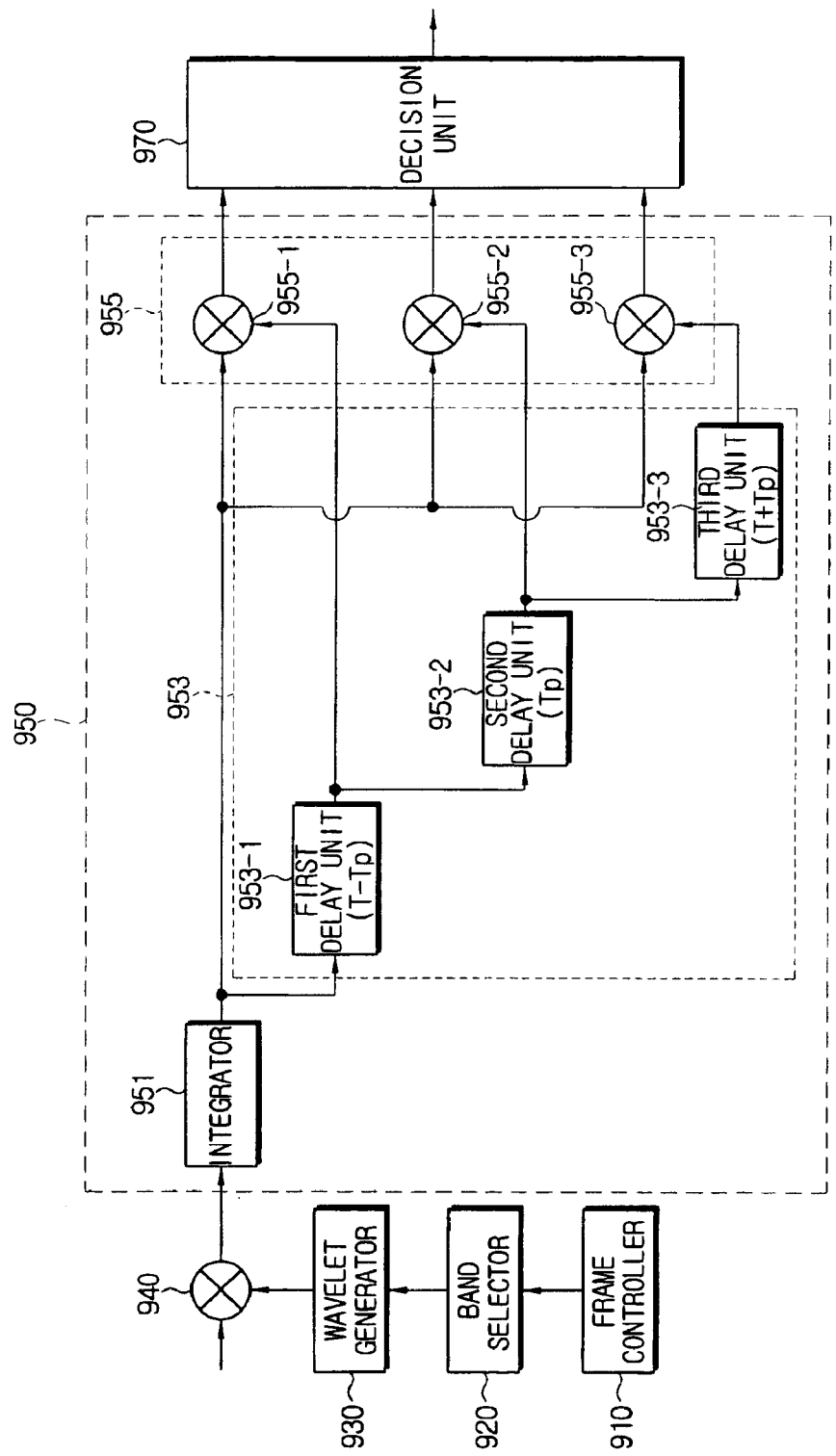
FIG. 11 is a detailed block diagram for showing a multi-band PPPSK reception system according to an embodiment of the present invention.
Figure 12:
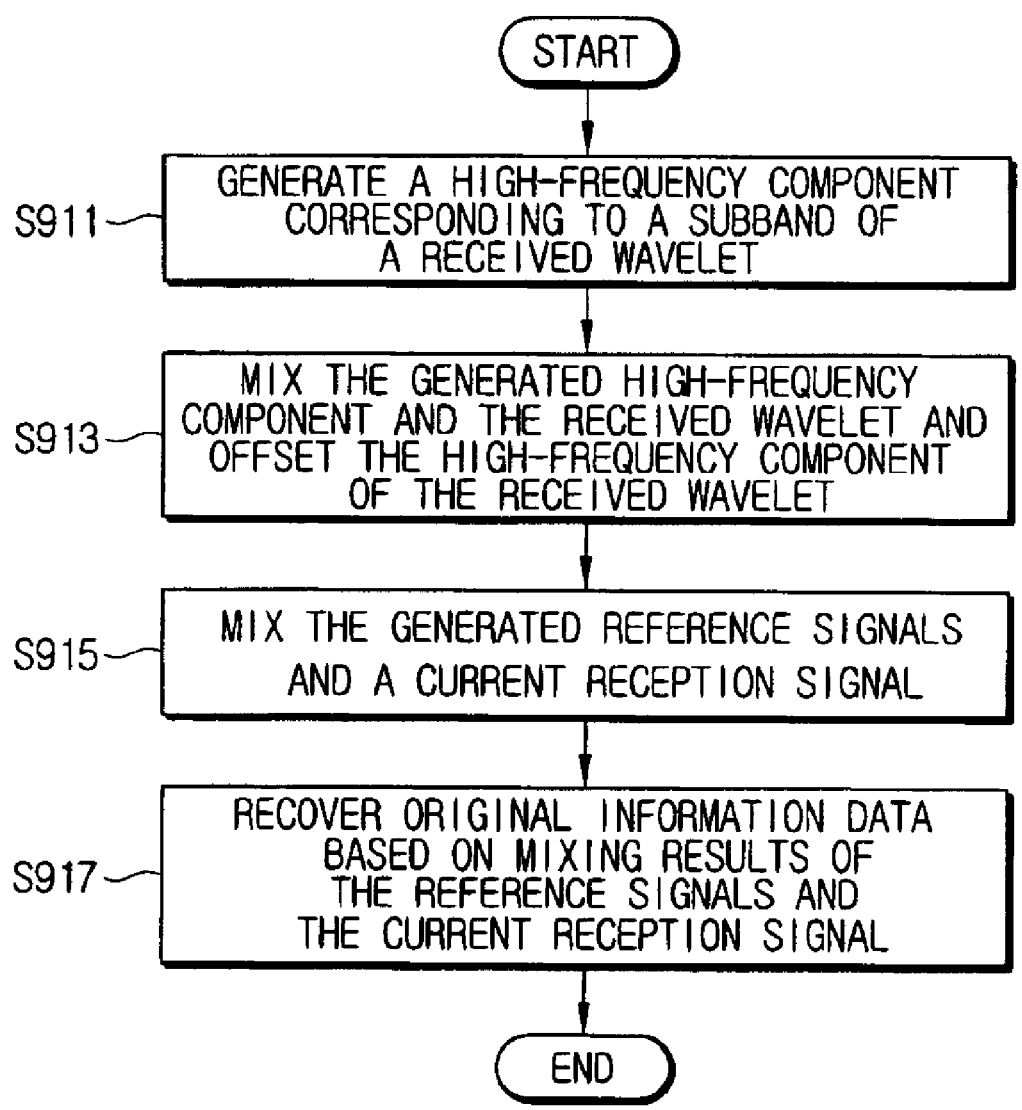
FIG. 12 is a flow chart for showing a signal processing method for the multi-band PPPSK reception system of FIG. 11.

FIG. 11 is a detailed block diagram for showing a multi-band PPPSK reception system according to an embodiment of the present invention, and FIG. 12 is a flow chart for showing a signal processing method for the multi-band PPPSK reception system of FIG. 12.

Hereinafter, with an exemplary multi-band PPPSK reception system to which the Binary DPSK scheme and the Binary PPM scheme are applied, its signal processing method will be described in detail with reference to FIG. 11 and FIG. 12. However, The schemes can be expanded into a multi-level DPSK scheme and a multi-level PPM scheme, respectively.

Received frame information is provided from the frame controller 910 to a band selector 920. The band selector 920 selects a subband of a received wavelet based on the frame information provided from the frame controller 910. The wavelet generator 930 generates a high-frequency component of a center frequency corresponding to a subband of the received wavelet (S911).

An offset unit 940 multiplies the generated high-frequency component by the received wavelet, and low-pass-filters the multiplication result to offset the high frequency component of the received wavelet (S913).

The wavelet of low-frequency component from which the high frequency component has been offset is inputted to a PPPSK demodulator 950.

The PPPSK demodulator 950 has an integrator 951 for integrating the wavelet of low-frequency component, a delay part 953 for generating a reference signal, and a mixing part 955 for mixing a current reception signal and the reference signal.

The delay part 953 has a first delay unit, a second delay unit, and a third delay unit. The first delay unit 953-1 delays time by T-Tp, the second delay unit 953-2 by T, and the third delay unit 953-3 by T+Tp, wherein T denotes a symbol period or a frame length, and Tp a time slot.

The mixing part 955 has a first mixer 955-1, a second mixer 955-2, and a third mixer 955-3 which mix a current reception signal with reference signals produced from the first, second, and third delay units 953-1, 953-2, and 953-3, respectively.

That is, the first, second, and third mixers 955-1, 955-2, and 955-3 mix a current reception signal with the reference signals produced from the first, second, and third delay units 953-1, 953-2, and 953-3, respectively (S915).

Here, three delay units and three mixers are provided due to the applications of the Binary DPSK scheme and the binary PPM scheme, but, in case that a multi-level DPSK scheme and the Binary PPM scheme are applied, the number of delay units and mixers corresponding to the schemes is provided.

The decision unit 970 recovers original information data based on the mixing results of the mixing part 955 mixing the reference signals and the current reception signal (S917).

Hereinafter, a process for demodulating an integrated reception signal in the PPPSK demodulator 950 is described in detail with reference to FIG. 13 and FIG. 14.

Figure 13:
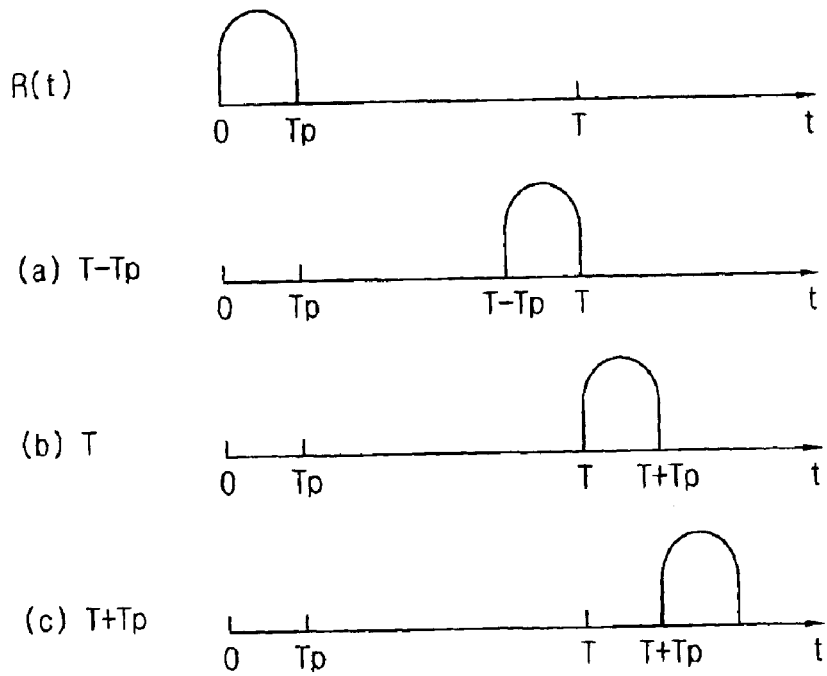
FIG. 13 and FIG. 14 are views for explaining PPPSK demodulation operations for the multi-band PPPSK reception system according to an embodiment of the present invention.

FIG. 13 shows reference signals generated from the delay part 953 with respect to a reception signal R(t) of wavelet having a phase of 0° at time t=0.

The first delay unit 953-1, as shown in (a) of FIG. 13, outputs a first reference signal in which the reception signal R(t) is delayed by T-Tp, so the first reference signal has a wavelet at time t=T-Tp.

The second delay unit 953-2, as shown in (b) of FIG. 13, outputs a second reference signal in which the reception signal R(t) is delayed by T, so the second reference signal has a wavelet at time t=T.

The third delay unit 953-3, as shown in (c) of FIG. 13, outputs a third reference signal in which the reception signal R(t) is delayed by T+Tp, so the third reference signal has a wavelet at time t=T+Tp.

The first, second, and third wavelets generated as above are inputted to the mixing part 955.

The first, second, and third reference signals inputted to the first, second, and third mixers 955-1, 955-2, and 955-3, respectively, are each mixed with the reception signal R(t+T) currently inputted.

The decision unit 970 decides original information data according to the mixing results of the first, second, and third mixers 955-1, 955-2, and 955-3.

Figure 14:
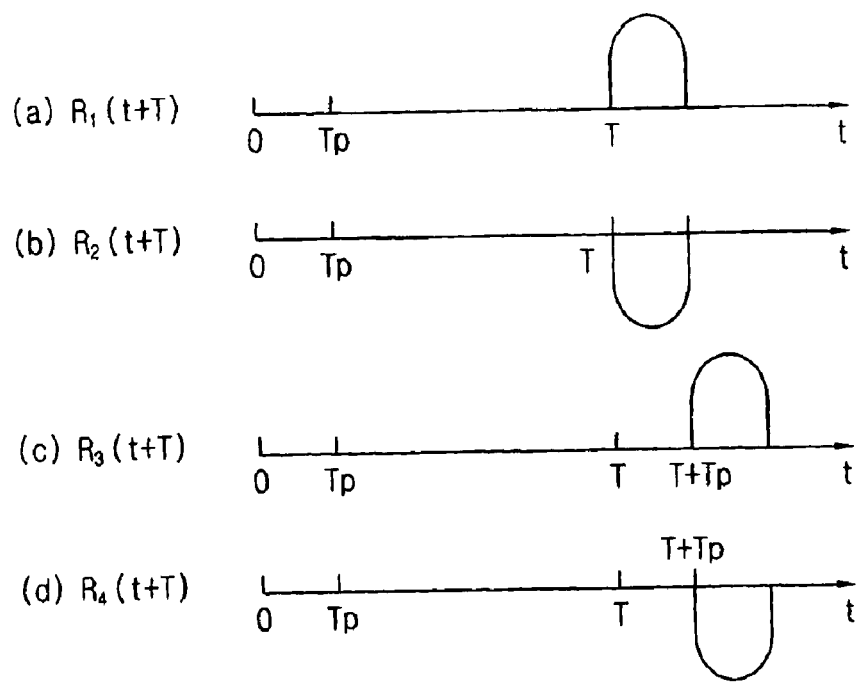

Descriptions are made on a process that the decision unit 970 decides original information data with a reception signal R(t+T) as shown in (a) to (d) of FIG. 14, for example.

As shown in (a) of FIG. 14, if the current reception signal $R_1(t+T)$ is a wavelet having a phase of 0° at time t=T, the reception signal $R_1(t+T)$ has the same timing position as the second reference signal((b) of FIG. 13) generated from the second delay unit 953-2.

Accordingly, the decision unit 970 decides the time information data of the current reception signal as "0". Further, the current reception signal $R_1(t+T)$ and the second reference signal((b) of FIG. 13) have the same phase, so the decision unit 970 recovers information data "00" for the current reception signal $R_1(t+T)$.

As shown in (b) of FIG. 14, if a current reception signal $R_2(t+T)$ is a wavelet having a phase of 180° at time t=T, the reception signal $R_2(t+T)$ has the same timing position as the second reference signal((b) of FIG. 13) generated from the second delay unit 953-2.

Accordingly, the decision unit 970 decides the time information data of the current reception signal as "0". Further, the current reception signal $R_2(t+T)$ and the second reference signal((b) of FIG. 13) have different phases, so the decision unit 970 decides the phase information data as "1". Accordingly, the decision unit 970 recovers the information data "10" for the current reception signal $R_2(t+T)$.

As shown in (c) of FIG. 14, if a current reception signal $R_3(t+T)$ is a wavelet having a phase of 0° at time t=T+Tp, the $R_3(t+T)$ has the same timing position as the third reference signal((c) of FIG. 13) generated from the third delay unit 953-3.

Therefore, the decision unit 970 decides the time information data of the current reception signal as "1". Further, the current reception signal $R_3(t+T)$ and the third reference signal((c) of FIG. 13) have the same phase, so the decision unit 970 decides the phase information data as "0". Accordingly, the decision unit 970 recovers the information data "01" for the current reception signal $R_3(t+T)$.

As shown in (d) of FIG. 14, if a current reception signal $R_4(t+T)$ is a wavelet having a phase of 180° at time t=T+Tp, the reception signal $R_3(t+T)$ has the same timing position as the third reference signal((c) of FIG. 13) generated from the third delay unit 953-3.

Therefore, the decision unit 970 decides the time information data of the current reception signal as "1". Further, the current reception signal $R_4(t+T)$ and the third reference signal((c) of FIG. 13) have different phases, so that the decision unit 970 decides the phase information data as "1". Accordingly, the decision unit 970 recovers the information data "11" for the current reception signal $R_4(t+T)$.

As above, a current reception signal is mixed based on reference signals generated from the delay unit 953, and the decision unit 970 recovers original information data from the current reception signal based on the mixed result.

Firstly, the present invention improves a wavelet transmission efficiency.

The PPPSK scheme simultaneously uses wavelet phase information and wavelet time information, bringing out an effect of increasing the number of bits per symbol compared to existing modulation schemes using one kind of information. This has an advantage of prolonging a time frame length so that multi-path interferences can be reduced.

Secondly, the structure of the transmission/reception system is simplified.

By using a noncoherent scheme employing relative differences between the phases and timing positions of a previous signal and a current reception signal, a channel estimation device is not needed to find out an absolute phase of a pulse at a signal reception side. Further, any equalizer is not needed at the signal reception side due to the reduced multi-path interferences as aforementioned.

Thirdly, electric power consumption is reduced.

The components for the transmission/reception system are simplified compared to the existing UWB communication scheme, which reduces the power consumption. Further, less wavelets are used for transmission performance equal to the existing UWB communication scheme, so that the wavelets are generated less frequently, to thereby relatively reduce the power consumption.

While the invention has been shown and described with reference to a certain exemplary embodiments thereof, it will be understood by those skilled in the art that various changes in form and details may be made therein without departing from the spirit and scope of the invention as defined by the appended claims.

What is claimed is:

1. A noncoherent pulse position and phase shift keying (PPPSK) transmission system, comprising:
    an information generation unit for generating information data;

a modulation unit for deciding a phase and a timing position corresponding to the generated information data; and a wavelet generation unit for generating a pulse based on the decided phase and timing position, and generating a wavelet formed with the pulse carrying a wave corresponding to a center frequency of a transmission frequency band.

2. The noncoherent PPPSK transmission system as claimed in claim 1, wherein the modulation unit includes:

a series/parallel converter for separating the information data into phase information data and time information data;

a phase modulator for deciding a phase of the wavelet based on the phase information data; and a position modulator for deciding a timing position of the wavelet based on the time information data.

3. The noncoherent PPPSK transmission system as claimed in claim 2, wherein the position modulator includes:

a delay part having at least one delay unit; and a switching unit for selecting one of the at least one delay unit based on the time information data, the position modulator deciding a timing position of the wavelet based on a delay state of the selected delay unit.

4. The noncoherent PPPSK transmission system as claimed in claim 2, wherein the information data includes n bits, and includes the phase information data of m bits and the time information data of l bits, where n=m+l, and n, m, and l are natural numbers.

5. A signal processing method for a noncoherent pulse position and phase shift keying(PPPSK) transmission system, comprising steps of:

generating information data;

deciding a phase and a timing position corresponding to the generated information data; and generating a pulse based on the decided phase and timing position, and generating a wavelet formed with the pulse carrying a wave corresponding to a center frequency of a transmission frequency band.

6. The signal processing method as claimed in claim 5, wherein the deciding step includes the steps of:

separating the information data into phase information data and time information data;

deciding a phase of the wavelet based on the phase information data; and deciding a timing position of the wavelet based on the time information data.

7. The signal processing method as claimed in claim 6, wherein the wavelet timing position deciding step includes the steps of:

selecting at least one delay state based on the time information data; and deciding a timing position of the wavelet based on the selected at least one delay state.

8. The signal processing method as claimed in claim 5, wherein the information data includes n bits, and includes the phase information data of m bits and the time information data of l bits, where n=m+l, and n, m, and l are natural numbers.

9. The signal processing method as claimed in claim 5, wherein the deciding step includes the steps of:

separating the information data into phase information data and time information data;

deciding a timing position of the wavelet based on the time information data; and deciding a phase of the wavelet based on the phase information data.

10. The signal processing method as claimed in claim 5, wherein the deciding step includes the steps of:

separating the information data into phase information data and time information data; and deciding a phase of the wavelet based on the phase information data and a timing position of the wavelet based on the time information data.

11. A noncoherent pulse position and phase shift keying (PPPSK) transmission system, comprising:

an information generation unit for generating information data;

a series/parallel converter for separating the information data into phase information data and time information data;

a phase modulator for deciding a phase of a modulated signal corresponding to the information data based on the phase information data;

a wavelet generation unit for generating a pulse based on the decided phase, and generating a wavelet formed with the pulse carrying a wave corresponding to a center frequency of a transmission frequency band; and a position modulator for deciding a timing position of the wavelet based on the time information data.

12. The noncoherent PPPSK transmission system as claimed in claim 11, wherein the position modulator includes:

a delay part having at least one delay unit; and a switching unit for selecting one of the at least one delay unit based on the time information data, the position modulator deciding a timing position of the wavelet based on a delay state of the selected delay unit.

13. The noncoherent PPPSK transmission system as claimed in claim 11, wherein the information data includes n bits, and includes the phase information data of m bits and the time information data of l bits, where n=m+l, and n, m, and l are natural numbers.

14. A signal processing method for a noncoherent pulse position and phase shift keying(PPPSK) transmission system, comprising steps of:

generating information data;

separating the information data into phase information data and time information data;

deciding a phase of a modulated signal corresponding to the information data based on the phase information data;

generating a pulse based on the decided phase, and generating a wavelet formed with the pulse carrying a wave corresponding to a center frequency of a transmission frequency band; and deciding a timing position of the wavelet based on the time information data.

15. The signal processing method as claimed in claim 14, wherein the timing position deciding step includes the steps of:

selecting at least one delay state based on the time information data; and deciding a timing position of the wavelet based on the selected at least one delay state.

16. The signal processing method as claimed in claim 14, wherein the information data includes n bits, and includes the phase information data of m bits and the time information data of l bits, where n=m+l, and n, m, and l are a natural numbers.

17. A noncoherent pulse position and phase shift keying (PPPSK) reception system, comprising:
- a wavelet generation unit for generating a high-frequency component corresponding to a center frequency of a transmission frequency band;
- an offset unit for offsetting a high frequency of a reception signal by using the generated high-frequency component;
- a demodulation unit for generating at least one reference signal based on a previous signal previously received with respect to the reception signal from which the high-frequency component is offset, and mixing each of the at least one reference signal with the reception signal to output mixing results; and
- a decision unit for deciding information data corresponding to the reception signal based on the mixing results.

18. The noncoherent PPPSK reception system as claimed in claim 17, wherein the demodulation unit includes:
- a delay part having at least one delay unit for generating at least one reference signal based on the previous signal; and
- a mixing part having at least one mixer for mixing the reception signal with each of the at least one reference signal.

19. The noncoherent PPPSK reception system as claimed in claim 17, wherein the decision unit decides time information data of the reception signal based on a same timing position of a reference signal of the at least one reference signal generated from the delay part as a timing position of the reception signal, compares a phase of the reference signal having the same timing position as the timing position of the reception signal with a phase of the reception signal and decides phase information data of the reception signal, and recovers the information data corresponding to the reception signal by using the time information data and the phase information data.

20. A signal processing method for a noncoherent pulse position and phase shift keying(PPPSK) reception system, comprising steps of:
- generating a high-frequency component corresponding to a center frequency of a transmission frequency band;
- offsetting a high frequency of a reception signal by using the generated high-frequency component;
- generating at least one reference signal based on a previous signal precedingly received with respect to the reception signal from which the high-frequency component is offset, and mixing the reference signals and the reception signal to output a mixing result; and
- deciding information data corresponding to the reception signal based on mixing results.

21. The signal processing method as claimed in claim 20, wherein the mixing step includes steps of:
- generating at least one reference signal based on the previous signal; and
- mixing the reception signal with each of the at least one reference signal.

22. The signal processing method as claimed in claim 20, wherein the deciding step decides time information data of the reception signal based on a same timing position of a reference signal of the generated reference signals as a timing position of the reception signal, compares a phase of the reference signal having the same timing position as the timing position of the reception signal with a phase of the reception signal and decides phase information data of the reception signal, and recovers the information data corresponding to the reception signal by using the time information data and the phase information data.

* * * * *